(12) United States Patent
Senf, Jr.

(10) Patent No.: US 11,073,313 B2
(45) Date of Patent: Jul. 27, 2021

(54) METHOD OF MANAGING COMPRESSOR START FOR TRANSPORT REFRIGERATION SYSTEM

(71) Applicant: Carrier Corporation, Palm Beach Gardens, FL (US)

(72) Inventor: Raymond L. Senf, Jr., Central Square, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 203 days.

(21) Appl. No.: 16/217,854

(22) Filed: Dec. 12, 2018

(65) Prior Publication Data

US 2019/0212038 A1  Jul. 11, 2019

Related U.S. Application Data

(60) Provisional application No. 62/616,175, filed on Jan. 11, 2018.

(51) Int. Cl.
*F25B 49/02* (2006.01)
*F25B 31/00* (2006.01)
(Continued)

(52) U.S. Cl.
CPC ....... *F25B 31/002* (2013.01); *B60H 1/00014* (2013.01); *B60H 1/00264* (2013.01); *B60H 1/3232* (2013.01); *B60P 3/20* (2013.01); *F25B 41/22* (2021.01); *F25B 49/022* (2013.01); *F25D 11/003* (2013.01); *F25B 2400/13* (2013.01); *F25B 2400/16* (2013.01); *F25B 2500/16* (2013.01); *F25B 2500/26* (2013.01); *F25B 2500/31* (2013.01); *F25B 2600/02* (2013.01); *F25B 2600/0272* (2013.01); *F25B 2600/25* (2013.01); *F25B 2600/2513* (2013.01); *F25B 2600/2515* (2013.01); *F25B 2700/151* (2013.01); *F25B 2700/197* (2013.01);
(Continued)

(58) Field of Classification Search
CPC .............. F25B 311/002; F25B 2500/16; F25B 2500/26; F25B 2500/31; F25B 2600/0272; F25B 2600/2513
See application file for complete search history.

(56) References Cited

U.S. PATENT DOCUMENTS 3,705,499 A   12/1972   Mount et al.
4,888,957 A   12/1989   Chmielewski
(Continued)

FOREIGN PATENT DOCUMENTS

CN   106288570 A   1/2017
GB      265590 A   7/1927
(Continued)

OTHER PUBLICATIONS

JP 2006-336932 (English Translation) (Year: 2006).*
(Continued)

*Primary Examiner* — Jonathan Bradford
(74) *Attorney, Agent, or Firm* — Cantor Colburn LLP

(57) ABSTRACT

A method of managing a compressor start operation, the method includes controlling a valve disposed upstream of a compressor to lower a saturated suction temperature of a refrigerant to be below an ambient temperature while starting the compressor.

15 Claims, 5 Drawing Sheets

(51) Int. Cl.
  *B60H 1/00* (2006.01)
  *B60P 3/20* (2006.01)
  *F25D 11/00* (2006.01)
  *B60H 1/32* (2006.01)
  *F25B 41/22* (2021.01)
(52) U.S. Cl.
  CPC ............ *F25B 2700/1931* (2013.01); *F25B 2700/1933* (2013.01); *F25B 2700/2106* (2013.01); *F25B 2700/21151* (2013.01); *F25B 2700/21152* (2013.01); *F25B 2700/21155* (2013.01); *F25B 2700/21174* (2013.01); *F25B 2700/21175* (2013.01)

(56) References Cited

U.S. PATENT DOCUMENTS

| | | | |
|---|---|---|---|
| 5,072,595 A * | 12/1991 | Barbier | F25B 41/006 |
| | | | 250/577 |
| 5,572,879 A | 11/1996 | Harrington et al. | |
| 6,539,734 B1 | 4/2003 | Weyna | |
| 7,325,411 B2 | 2/2008 | Bush | |
| 8,240,161 B2 | 8/2012 | Lifson et al. | |
| 8,359,873 B2 | 1/2013 | Lifson et al. | |
| 8,418,483 B2 | 4/2013 | McSweeney et al. | |
| 8,459,053 B2 | 6/2013 | Pham et al. | |
| 8,616,855 B2 | 12/2013 | Burchill et al. | |
| 8,720,212 B2 | 5/2014 | Wakuta et al. | |
| 9,194,393 B2 | 11/2015 | Pham | |
| 9,482,454 B2 | 11/2016 | Goel et al. | |
| 9,494,352 B2 | 11/2016 | Lifson et al. | |
| 9,791,175 B2 | 10/2017 | Senf, Jr. | |
| 2009/0013701 A1 * | 1/2009 | Lifson | F25B 41/043 |
| | | | 62/77 |
| 2011/0203299 A1 * | 8/2011 | Jing | F25B 47/025 |
| | | | 62/80 |
| 2012/0247138 A1 | 10/2012 | Senf, Jr. et al. | |
| 2014/0230476 A1 * | 8/2014 | Yura | F25B 31/002 |
| | | | 62/192 |
| 2015/0007597 A1 * | 1/2015 | Sent, Jr. | F25B 1/04 |
| | | | 62/115 |
| 2015/0185197 A1 | 7/2015 | Liang | |
| 2016/0018148 A1 | 1/2016 | Yura | |
| 2017/0089598 A1 | 3/2017 | Wallace et al. | |
| 2017/0175743 A1 | 6/2017 | Dunn et al. | |

FOREIGN PATENT DOCUMENTS

| | | |
|---|---|---|
| JP | 2013029269 A | 2/2013 |
| SG | 2004156858 A | 6/2004 |
| WO | 2017176682 A1 | 10/2017 |

OTHER PUBLICATIONS

European Search Report for Application No. 19151219.3; dated Jun. 7, 2019; 9 Pages.
Singaporean Search Report for Application No. 10201900225S; dated May 12, 2019; 2 Pages.
Singaporean Written Opinion for Application No. 10201900225S; dated Feb. 26, 2021; 6 Pages.

* cited by examiner

METHOD OF MANAGING COMPRESSOR START FOR TRANSPORT REFRIGERATION SYSTEM

CROSS-REFERENCE TO RELATED APPLICATION

This application claims priority to U.S. Provisional Application No. 62/616,175, filed Jan. 11, 2018, the disclosure of which is incorporated herein by reference in its entirety.

BACKGROUND

This disclosure relates generally to transport refrigeration systems and, more particularly, to a compressor start system and method for highly soluble refrigerants and oil combinations utilized in transport refrigeration systems.

A transport refrigeration system used to control enclosed areas, such as the insulated box used on trucks, trailers, containers, or similar intermodal units, functions by absorbing heat from the enclosed area and releasing heat outside of the box into the environment. The transport refrigeration system commonly includes a compressor to pressurize refrigerant vapor, and a condenser to cool the pressurized vapor from the compressor, thereby changing the state of the refrigerant from a gas to a liquid. Ambient air may be blown across the refrigerant coils in the condenser to effect the heat exchange. The transport refrigeration system further includes an evaporator for drawing heat out of the box by drawing or pushing return air across refrigerant-containing coils within the evaporator. This step vaporizes any remaining liquid refrigerant flowing through the evaporator, which may then be drawn through a suction modulation valve ("SMV") and back into the compressor to complete the circuit.

New environmentally friendly refrigerants are being developed to meet various requirements (e.g., regulatory). Some of these newer refrigerants are not as suitable for certain applications of transport refrigeration systems when compared to previously employed refrigerants (e.g., R134a, R404a, etc.). Specifically, compressor developmental testing shows that in low ambient, low evaporation flooded start conditions, the solubility of the refrigerant in the newer oil is shown to be very high and degrades the viscosity of the oil. Viscosity degradation may lead to failure of various components, such as bearings and other lubricated components such as scrolls, Oldham couplings, couplers and bushings, for example.

BRIEF SUMMARY

Disclosed is a method of managing a compressor start operation, the method comprising controlling a valve disposed upstream of a compressor to lower a saturated suction temperature of a refrigerant to be below an ambient temperature while starting the compressor.

In addition to one or more of the features described above, or as an alternative, further embodiments may include that the valve is a suction modulation valve.

In addition to one or more of the features described above, or as an alternative, further embodiments may include that the valve is an electronic evaporator expansion valve.

In addition to one or more of the features described above, or as an alternative, further embodiments may include that the saturated suction temperature of the refrigerant is lowered to be at least 30 degrees Fahrenheit below the ambient temperature.

In addition to one or more of the features described above, or as an alternative, further embodiments may include that the saturated suction temperature of the refrigerant is lowered by adjusting a pressure of the refrigerant with the valve.

Also disclosed is a method of managing a compressor start operation for a transport refrigeration unit. The method includes determining an ambient temperature surrounding a compressor. The method also includes starting the compressor. The method further includes actively controlling a valve disposed within a refrigerant line and upstream of the compressor, wherein actively controlling the valve adjusts the pressure of the refrigerant to lower the saturated suction temperature of the refrigerant to be below the ambient temperature by a threshold temperature difference.

In addition to one or more of the features described above, or as an alternative, further embodiments may include that the valve is a suction modulation valve.

In addition to one or more of the features described above, or as an alternative, further embodiments may include that the valve is an electronic evaporator expansion valve.

In addition to one or more of the features described above, or as an alternative, further embodiments may include that the threshold temperature difference is at least 30 degrees Fahrenheit.

In addition to one or more of the features described above, or as an alternative, further embodiments may include that the method is performed when the ambient temperature is below a threshold ambient temperature.

In addition to one or more of the features described above, or as an alternative, further embodiments may include that the threshold ambient temperature is equal to or less than 120 degrees Fahrenheit.

Further disclosed is a transport refrigeration system including a compressor, a condenser downstream of the compressor, an expansion device downstream of the condenser, and an evaporator downstream of the expansion device, and a refrigerant circulating from the compressor to the condenser, through the expansion device and the evaporator and then returning to the compressor. Also included is a control module to adjust a valve disposed in a refrigerant line and upstream of the compressor, adjustment of the valve adjusting the pressure of the refrigerant to lower the saturated suction temperature of the refrigerant to be below the ambient temperature by a threshold temperature difference.

In addition to one or more of the features described above, or as an alternative, further embodiments may include that the valve is a suction modulation valve.

In addition to one or more of the features described above, or as an alternative, further embodiments may include that the valve is an electronic evaporator expansion valve.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
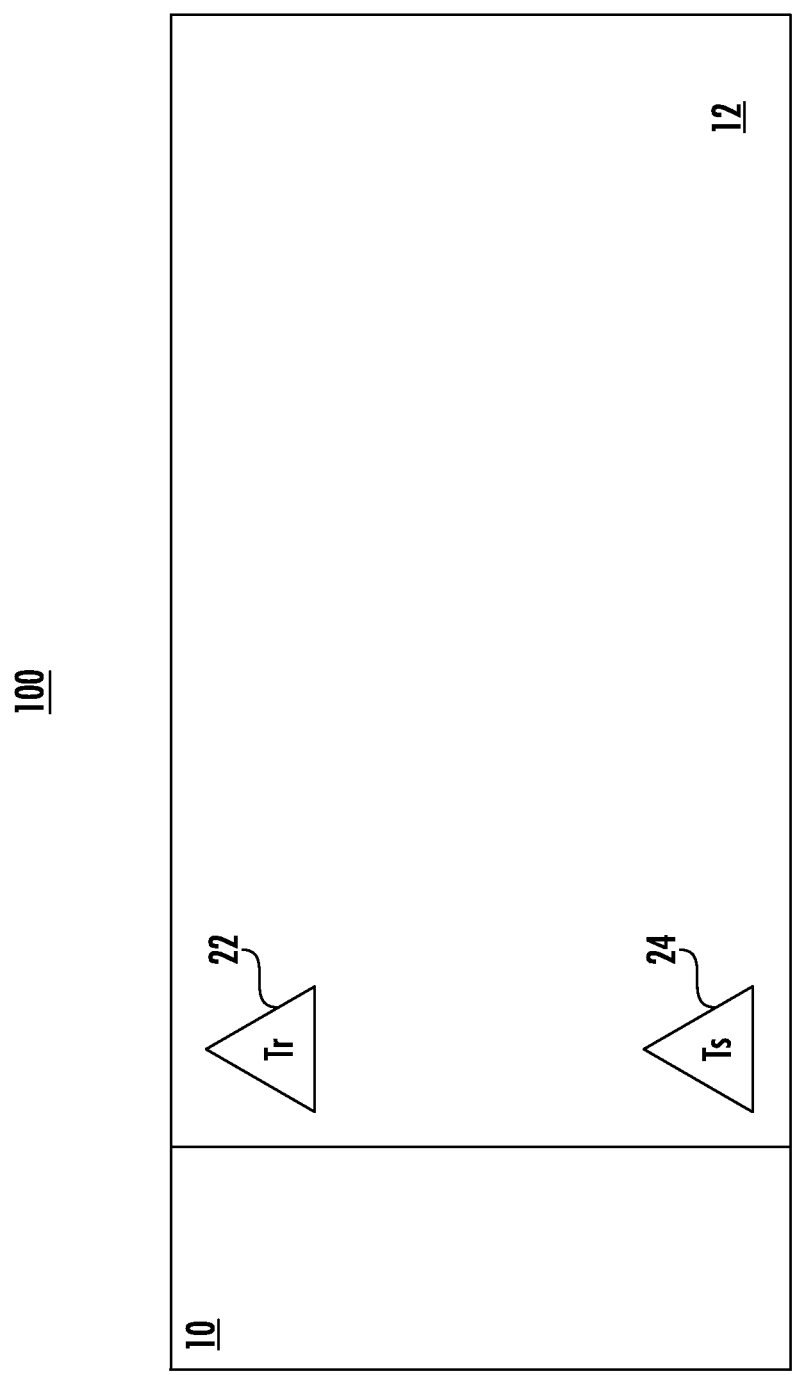
FIG. 1 is a diagram of a transport refrigeration system.

FIG. 1 is a diagram that shows an embodiment of a transport refrigeration system. As shown in FIG. 1, a transport refrigeration system 100 can include a transport refrigeration unit 10 coupled to an enclosed space within a container 12. As shown in FIG. 1, the transport refrigeration unit 10 is configured to maintain a prescribed thermal environment within the container 12 (e.g., cargo in an enclosed volume).

In FIG. 1, the transport refrigeration unit 10 is connected at one end of the container 12. Alternatively, the transport refrigeration unit 10 can be coupled to a prescribed position on a side or more than one side of the container 12. In one embodiment, a plurality of transport refrigeration units can be coupled to a single container 12. Alternatively, a single transport refrigeration unit 10 can be coupled to a plurality of containers 12. The transport refrigeration unit 10 can operate to induct air at a first temperature and to exhaust air at a second temperature. In one embodiment, the exhaust air from the transport refrigeration unit 10 will be warmer than the inducted air such that the transport refrigeration unit 10 is employed to warm the air in the container 12. In one embodiment, the exhaust air from the transport refrigeration unit 10 will be cooler than the inducted air such that the transport refrigeration unit 10 is employed to cool the air in the container 12. The transport refrigeration unit 10 can induct air from the container 12 having a return temperature Tr (e.g., first temperature) and exhaust air to the container 12 having a supply temperature Ts (e.g., second temperature).

In one embodiment, the transport refrigeration unit 10 can include one or more sensors (wired or wireless) to continuously or repeatedly monitor conditions or operations for the transport refrigeration unit 10. As shown in FIG. 1, exemplary sensors can include a first temperature sensor 24 of the transport refrigeration unit 10 that can provide the supply temperature Ts and a second temperature sensor 22 of the transport refrigeration unit 10 that can provide the return temperature Tr to the transport refrigeration unit 10, respectively.

A transport refrigeration system 100 can provide air with controlled temperature, humidity or/and species concentration into an enclosed chamber where cargo is stored such as in container 12. As known to one skilled in the art, the transport refrigeration system 100 (e.g., controller 220) is capable of controlling a plurality of the environmental parameters or all the environmental parameters within corresponding ranges with a great deal of variety of cargos and under all types of ambient conditions.

Figure 2:
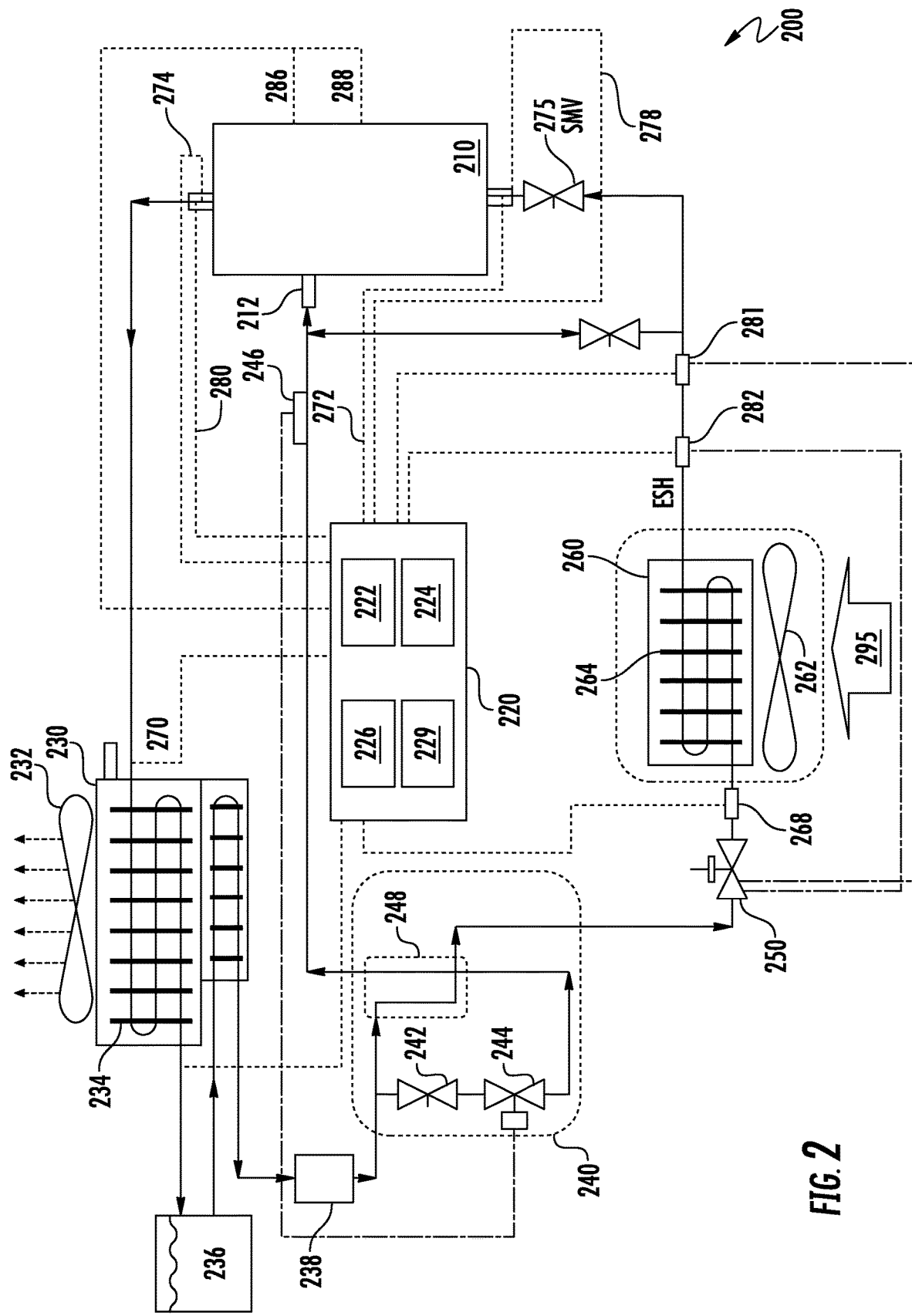
FIG. 2 schematically illustrates a transport refrigeration unit.

FIG. 2 is a diagram that shows an embodiment of a transport refrigeration unit. As shown in FIG. 2, transport refrigeration unit 200 can be operatively coupled to a container (not shown), which can be used with a trailer, an intermodal container, a train railcar, a ship or the like, used for the transportation or storage of goods requiring a temperature controlled environment, such as, for example foodstuffs and medicines (e.g., perishable or frozen). The container can include an enclosed volume for the transport/storage of such goods. The enclosed volume may be an enclosed space having an interior atmosphere isolated from the outside (e.g., ambient atmosphere or conditions) of the container.

As shown in FIG. 2, compressor 210 can be a scroll compressor; however, other compressors such as reciprocating or screw compressors are possible without limiting the scope of the disclosure. A motor (not shown) can be used to drive the compressor 210. For example, a motor can be an integrated electric drive motor driven by a synchronous generator, a commercial power service an external power generation system (e.g., shipboard), a generator or the like. The compressor 210 can be a multi-stage compression device.

High temperature, high pressure refrigerant vapor exiting the compressor 210 can move to the air-cooled condenser 230, which can include a plurality of condenser coil fins and tubes 234, which receive air, typically blown by a condenser fan 232. By removing latent heat through the condenser 230, the refrigerant condenses to a high pressure/high temperature liquid and flows to a receiver 236 that can provide storage for excess liquid refrigerant during low temperature operations. From the receiver 236, the refrigerant can flow to a filter-drier 238 that can keep the refrigerant clean and dry.

The unit 200 can include an economizer. An economizer device 240 can increase the refrigerant subcooling. When the economizer device 240 is active, valve 242 can open to allow refrigerant to pass through an auxiliary expansion valve 244 having a sensing bulb 246 located upstream of an intermediate inlet port 212 of the compressor 210. The valve 244 can be controlled responsive to the temperature measured at the bulb 246, and serve to expand and cool the refrigerant that proceeds into an economizer counter-flow heat exchanger 248, which can additionally sub-cool the liquid refrigerant.

The refrigerant flows from economizer heat exchanger 248 of the economizer device 240 to an electronic evaporator expansion valve ("EVXV") 250. As the liquid refrigerant passes through the orifice of the EVXV 250, at least some of the liquid refrigerant can vaporize. The refrigerant then flows through the tubes or coils 264 of an evaporator 260. The evaporator 260 can absorb heat from the return air 295 (e.g., air returning from the box or container) and in so doing, vaporize some or all of the remaining liquid refrigerant in the evaporator 260. The return air 295 is preferably drawn or pushed across the tubes or coils 264 by at least one evaporator fan 262. The refrigerant vapor can be drawn from the evaporator 260 through a suction modulation valve ("SMV") 275 back into the compressor 210.

Many of the points in the transport refrigeration unit 200 can be monitored and controlled by a controller 220. Controller 220 can include a microprocessor 222 and an associated memory 224. The memory 224 of controller 220 can contain operator or owner preselected, desired values for various operating parameters within the unit 200 including, but not limited to, temperature set points for various locations within the unit 200 or the box, pressure limits, current limits, engine speed limits, and any variety of other desired operating parameters or limits with the unit 200 or a refrigeration system. In one embodiment, controller 220 can include a microprocessor board that contains microprocessor 222 and memory 224, an input/output (I/O) board 226 that can include an analog to digital converter 229. The I/O can receive temperature inputs and pressure inputs from various points in the system, AC current inputs, DC current inputs, voltage inputs and humidity level inputs. In addition, I/O board 226 can include drive circuits or field effect transistors ("FETs") and relays to receive signals or current from the controller 220 and in turn control various external or peripheral devices in the unit 200, such as the EVXV 250 and/or SMV 275, for example.

Among exemplary sensors and/or transducers monitored by controller 220 can be a return air temperature (RAT) sensor 268 that input into the microprocessor 222 a variable resistor value according to the evaporator return air temperature. An ambient air temperature (AAT) sensor 270 that can provide microprocessor 222 an ambient air temperature value (e.g., read in front of the condenser 230). A compressor suction temperature (CST) sensor 272 that can input to the microprocessor a variable resistor value according to the compressor suction temperature. A compressor discharge temperature (CDT) sensor 274 that can detect a compressor discharge temperature inside the dome of compressor 210. An evaporator outlet temperature (EVOT) sensor 281 and an evaporator outlet pressure (EVOP) transducer 282 that can detect an outlet temperature value and an evaporator outlet pressure of evaporator 260. A compressor suction pressure (CSP) transducer 278 can provide microprocessor 222 a variable voltage according to a compressor suction value of compressor 210. A compressor discharge pressure (CDP) transducer 280 that can provide to microprocessor 222 a variable voltage according to a compressor discharge value of compressor 210. In addition, direct current sensor 286 and alternating current sensor 288 (CT1 and CT2, respectively) can detect current drawn by the compressor 210.

In one embodiment, the microprocessor 222 can use inputs from the EVOP sensor 282 and EVOT sensor 281 to calculate the evaporator coil evaporator superheat ESH, using algorithms understood by those of ordinary skill in the art. The microprocessor 222 can then compare the calculated evaporator superheat value ESH to a preselected, desired superheat value, or set point, which can be stored in memory 224. The microprocessor 222 can then actuate the EVXV 250 depending upon differences between actual and desired evaporator superheat ESH in order to approach or maintain the desired superheat setting (e.g., a prescribed superheat, a condition selected superheat, or the minimum superheat to maximize unit capacity). Microprocessor 222 may be programmed to operate at a prescribed setting or at the lowest setting of superheat that can be maintained or controlled, and that will reduce or prevent an operational flood back (e.g., escape of liquid refrigerant into the compressor). The prescribed or lowest setting value will vary depending upon the capacity and specific configuration of the unit 200. For example, such an operation value can be determined through experimentation by those of ordinary skill in the art. In one embodiment, such a level of superheat may then be used as the "base implementation" superheat or a base setting from which superheat offsets can be made in the event of various operating conditions and/or ambient conditions.

Figure 3:
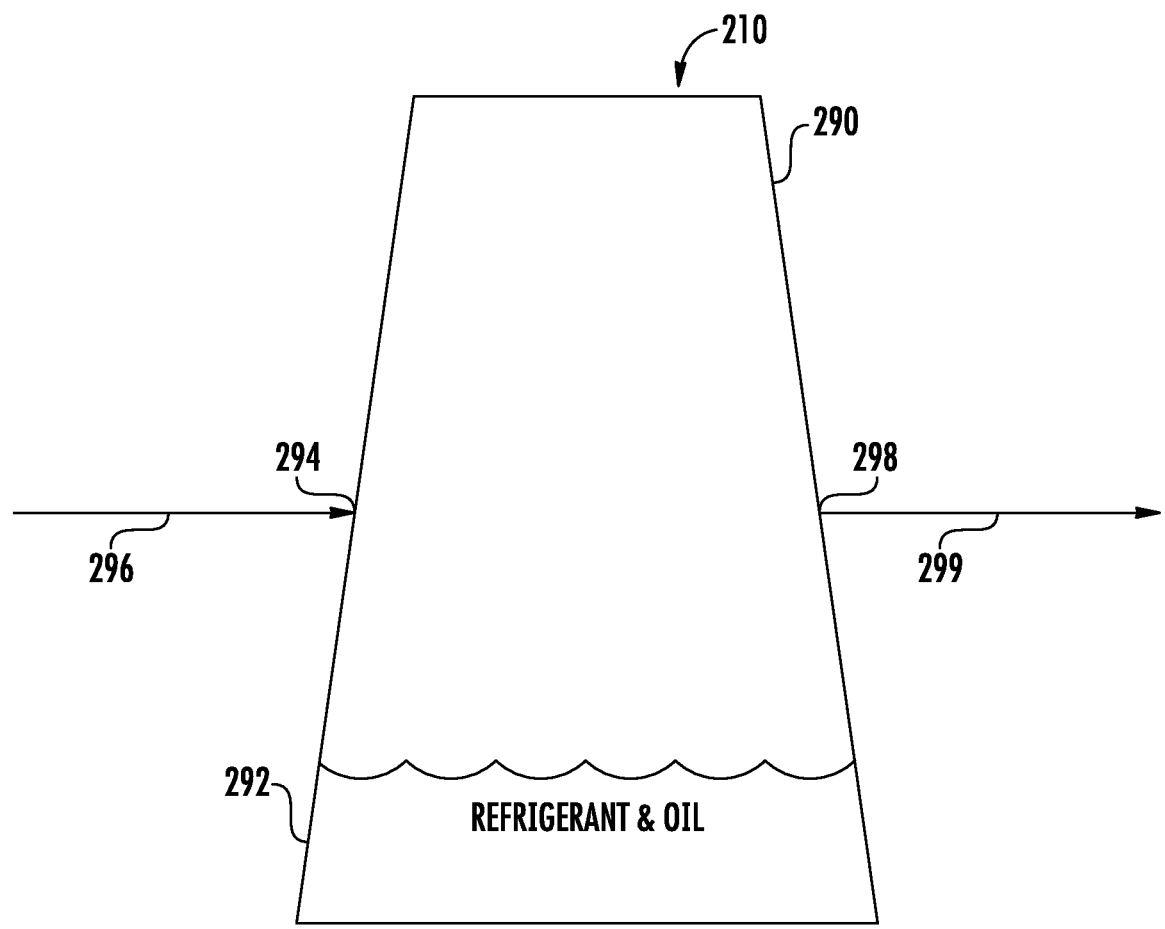
FIG. 3 is an elevational view of a compressor of the transport refrigeration unit.

Referring now to FIG. 3, the compressor 210 is shown in more detail. The compressor 210 includes a body portion 290 and a compressor sump 292. The compressor 210 includes at least one inlet 294 for receiving fluid from a suction line 296. The compressor 210 also includes at least one outlet 298 for discharging fluid from a discharge line 299. As shown, liquid refrigerant may collect in the compressor sump 292 during a non-operational state of the compressor 210 and may "flood" the compressor 210 which contains oil. The refrigerant mixes with the oil therein and dilutes the mixture. Blended refrigerants have been developed to meet environmental regulations, but the solubility of these blended refrigerants are highly soluble in oil in low ambient, low evaporation flooded start conditions. The increased solubility undesirably reduces the viscosity of the oil, such as polyolester (POE) oil.

Figure 4:
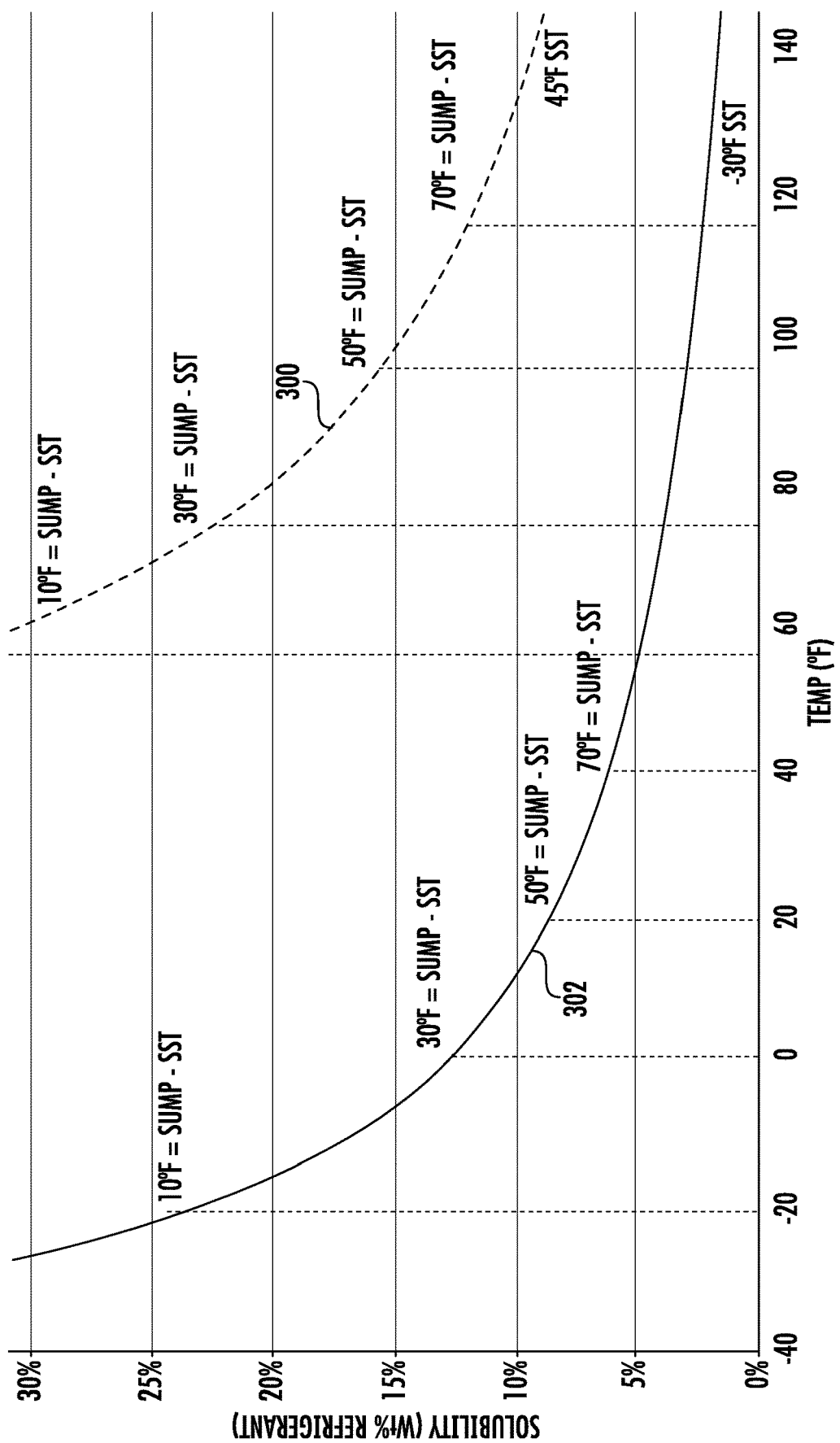
FIG. 4 is a plot of refrigerant solubility vs. temperature.

Referring now to FIG. 4, two solubility curves of the oil and the blended refrigerant shows that the oil viscosity quality of the oil is enhanced with a greater difference between the fluid sump temperature and the saturated refrigerant temperature at low ambient conditions. In particular, one curve 300 shows a solubility curve with various solubilities for a saturated refrigerant temperature of 45 degrees Fahrenheit. The other curve 302 shows a solubility curve with various solubilities for a saturated refrigerant temperature of −30 degrees Fahrenheit.

The fluid sump temperature is known by referring to the ambient temperature. This is referred to as "Sump" in the equations shown in FIG. 4 and is represented along the horizontal axis of FIG. 4. The term SST in the equations shown in FIG. 4 refer to the constant saturated refrigerant temperatures of curves 300 and 302, specifically 45 degrees Fahrenheit for curve 300 and −30 degrees Fahrenheit for curve 302. As an example, on curve 302, at 40 degrees Fahrenheit ambient, the temperature difference between the sump temperature and the saturated refrigerant temperature is 70 degrees Fahrenheit. This is shown to be in what is characterized as a good zone for compressor start and system operation. A temperature difference of 30 degrees Fahrenheit along curve 302 is shown to be in a marginal zone for compressor start and system operation. A temperature difference of only 10 degrees Fahrenheit along curve 302 is shown to be in what is characterized as a bad zone for compressor start and system operation. Therefore, as stated above, the greater the temperature difference between the sump temperature and the saturated refrigerant temperature, the better condition for compressor start and system operation. Curve 300 shows all of the example temperature differences to be in either the "bad" or "marginal" zones.

An embodiment of a method of managing compressor starting in a flooded condition is described herein. The method increases the temperature difference between the sump temperature and the saturated refrigerant temperature to achieve the illustrated shift of the curve(s) in FIG. 4. The method shown in FIG. 5 can be implemented in, and will be described using, the transport refrigeration unit 200 of FIGS. 2 and 3. However, the method is not intended to be limited to such a specific embodiment.

Figure 5:
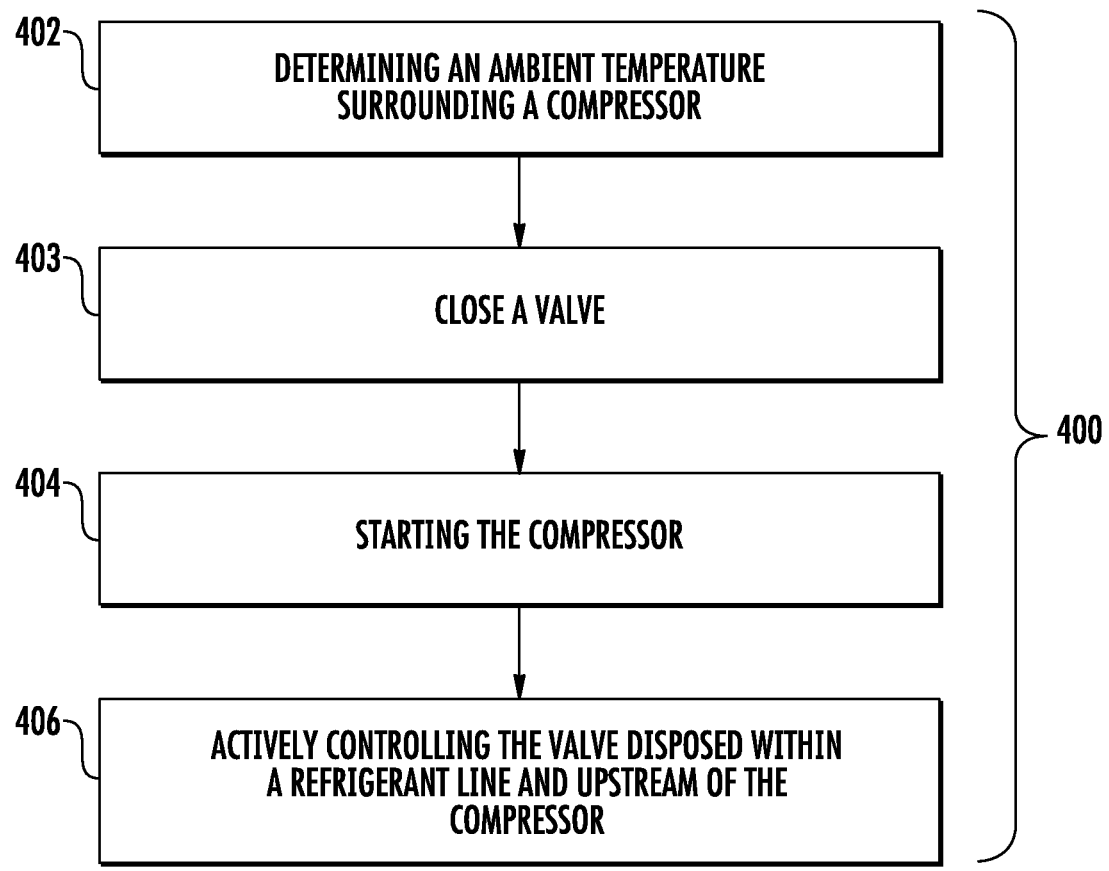
FIG. 5 is a flow diagram illustrating a method of managing a compressor start operation for the transport refrigeration unit.

The method is generally referenced with numeral 400 in FIG. 5. The method 400 includes managing a flooded compressor start operation, the method comprising controlling a valve (EVXV 250 or SMV 275) disposed upstream of the compressor 210 to lower a saturated suction temperature of a refrigerant to be below an ambient temperature while starting the compressor 210. In the illustrated embodiment, block 402 represents the controller 220 determining an ambient temperature surrounding the compressor 210. Block 404 illustrates starting the compressor 210. In some embodiments, valve(s) 250 and/or 275 are closed prior to starting the compressor, as represented with block 403. Block 406 illustrates actively controlling a valve 250 and/or 275 disposed within a refrigerant line and upstream of the compressor 210. Actively controlling one or both of the valves adjusts the pressure of the refrigerant to lower the saturated suction temperature of the refrigerant to be below the ambient temperature by a threshold temperature difference. Satisfying the threshold temperature difference ensures that the solubility of the refrigerant is reduced to be in or near the "good" zone illustrated in FIG. 4. In some embodiments, the threshold temperature difference is at least 30 degrees Fahrenheit, but will depend on the particular application and conditions.

The method 400 is particularly advantageous when the compressor is in a "flooded" condition and the ambient temperature is low (i.e., cold start). For example, in some embodiments, the method may be utilized when the ambient temperature is below 120 degrees Fahrenheit, but higher or lower temperatures are contemplated.

By reducing the solubility of the refrigerant, the viscosity of the refrigerant-oil mixture is desirably increased. Increased viscosity improves compressor reliability returning the oil back to more desirable viscosity characteristics rather than the disregarded state, thereby improving pressurized and boundary layer lubrication regime within the compressor at start up and initial operation conditions. The method takes into account newly discovered limitations of the new blended refrigerants described above.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of managing a compressor start operation, the method comprising controlling a valve disposed upstream of a compressor to lower a saturated suction temperature of a refrigerant to be below an ambient temperature while starting the compressor;
    wherein controlling the valve includes actively controlling the valve to lower the saturated suction temperature of the refrigerant to be below the ambient temperature by a threshold temperature difference such that solubility of the refrigerant with respect to oil is below a desired level;
    wherein the saturated suction temperature of the refrigerant is lowered to be at least 38 degrees Celsius below the ambient temperature.

2. The method of claim 1, wherein the valve is a suction modulation valve.

3. The method of claim 1, wherein the valve is an electronic evaporator expansion valve.

4. The method of claim 1, wherein the saturated suction temperature of the refrigerant is lowered by adjusting a pressure of the refrigerant with the valve.

5. The method of claim 1, wherein controlling the valve includes actively controlling the valve to lower the saturated suction temperature of the refrigerant to be below the ambient temperature by a threshold temperature difference such that solubility of the refrigerant with respect to oil is below 10%.

6. A method of managing a compressor start operation for a transport refrigeration unit, the method comprising:
    determining an ambient temperature surrounding a compressor;
    starting the compressor; and
    actively controlling a valve disposed within a refrigerant line and upstream of the compressor, wherein actively controlling the valve adjusts the pressure of the refrigerant to lower the saturated suction temperature of the refrigerant to be below the ambient temperature by a threshold temperature difference;
    wherein controlling the valve includes actively controlling the valve to lower the saturated suction temperature of the refrigerant to be below the ambient temperature by a threshold temperature difference such that solubility of the refrigerant with respect to oil is below a desired level;
    wherein the threshold temperature difference is at least 38 degrees Celsius.

7. The method of claim 6, wherein the valve is a suction modulation valve.

8. The method of claim 6, wherein the valve is an electronic evaporator expansion valve.

9. The method of claim 6, wherein the method is performed when the ambient temperature is below a threshold ambient temperature.

10. The method of claim 9, wherein the threshold ambient temperature is equal to or less than 120 degrees Fahrenheit.

11. A transport refrigeration system comprising:
    a compressor, a condenser downstream of the compressor, an expansion device downstream of the condenser, and an evaporator downstream of the expansion device, and a refrigerant circulating from the compressor to the condenser, through the expansion device and the evaporator and then returning to the compressor; and
    a control module to adjust a valve disposed in a refrigerant line and upstream of the compressor, adjustment of the valve adjusting the pressure of the refrigerant to lower the saturated suction temperature of the refrigerant to be below the ambient temperature by a threshold temperature difference;
    wherein the control module actively controls the valve to lower the saturated suction temperature of the refrigerant to be below the ambient temperature by a threshold temperature difference such that solubility of the refrigerant with respect to oil is below a desired level;
    wherein the threshold temperature difference is at least 38 degrees Celsius.

12. The transport refrigeration system of claim 11, wherein the valve is a suction modulation valve.

13. The transport refrigeration system of claim 11, wherein the valve is an electronic evaporator expansion valve.

14. The transport refrigeration system of claim 11, wherein the transport refrigeration system includes a suction modulation valve and an electronic evaporator expansion valve, wherein the control module actively controls the suction modulation valve to lower the saturated suction temperature of the refrigerant to be below the ambient temperature by the threshold temperature difference.

15. A method of managing a compressor start operation, the method comprising controlling a valve disposed upstream of a compressor to lower a saturated suction temperature of a refrigerant to be below an ambient temperature while starting the compressor;
    wherein controlling the valve includes actively controlling the valve to lower the saturated suction temperature of the refrigerant to be below the ambient temperature by a threshold temperature difference such that solubility of the refrigerant with respect to oil is below 10%.

* * * * *